US012769846B2

(12) United States Patent
Yuan et al.

(10) Patent No.: US 12,769,846 B2
(45) Date of Patent: Oct. 20, 2026

(54) MANAGING CONTAINERS USING DATA STRUCTURE FOR FIXING SECURITY VULNERABILITIES AND EXPOSURES

(71) Applicant: International Business Machines Corporation, Armonk, NY (US)

(72) Inventors: Yi Yuan, Beijing (CN); Xiao Hu He, Beijing (CN); XiaoPeng Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 18/657,911

(22) Filed: May 8, 2024

(65) Prior Publication Data

US 2025/0348591 A1 Nov. 13, 2025

(51) Int. Cl.
*G06F 21/57* (2013.01)
*G06F 21/54* (2013.01)

(52) U.S. Cl.
CPC ............ *G06F 21/577* (2013.01); *G06F 21/54* (2013.01)

(58) Field of Classification Search
USPC .............................................................. 267/22
See application file for complete search history.

(56) References Cited

U.S. PATENT DOCUMENTS 8,775,392 B1 * 7/2014 Walker ................ G06F 16/1734 707/695
10,002,247 B2 * 6/2018 Suarez .................... G06F 21/31
10,241,778 B2 * 3/2019 Emeis ........................ G06F 8/65
10,379,841 B2 * 8/2019 Wong ....................... G06F 8/658
10,831,474 B2 11/2020 Azagury et al.
11,175,939 B2 11/2021 Kumatagi et al.
11,243,758 B2 * 2/2022 Mamgain .................. G06F 8/65
11,656,864 B2 5/2023 Chen et al.
12,014,162 B2 * 6/2024 Kumar .................... G06F 9/445
2017/0116412 A1 * 4/2017 Stopel ................... G06F 21/577
2018/0114025 A1 * 4/2018 Cui ........................... G06F 8/65
(Continued)

FOREIGN PATENT DOCUMENTS

CN 108052373 A 5/2018
GB 2604967 A * 9/2022 ........... G06F 16/188

OTHER PUBLICATIONS

U.S. Appl. No. 63/507,157, filed Jun. 9, 2023, Dubey, Apporva.*
(Continued)

*Primary Examiner* — Eleni A Shiferaw
*Assistant Examiner* — Duilio Munguia
(74) *Attorney, Agent, or Firm* — Yee & Associates, P.C.

(57) ABSTRACT

A computer-implemented method for managing containers. A processor set retrieves a container image from a container repository. The container image is retrieved by a host comprising a copy of the container image. The processor set updates the copy of the container image on the host based on filesystems in the container image retrieved from the container repository and metadata for the application packages associated with the container image retrieved from the container repository. The processor set creates a data structure comprising information for fixing security vulnerabilities and exposures for containers based on the metadata for the application packages, information associated with the application packages, and information associated with containers for the container image on the host.

20 Claims, 9 Drawing Sheets

(56) References Cited

U.S. PATENT DOCUMENTS

| | | | | |
|---|---|---|---|---|
| 2020/0074084 | A1* | 3/2020 | Dorrans | G06F 21/577 |
| 2020/0097662 | A1* | 3/2020 | Hufsmith | H04L 9/0643 |
| 2021/0073019 | A1* | 3/2021 | Murray | H04L 9/3239 |
| 2021/0173935 | A1* | 6/2021 | Ramasamy | G06F 21/577 |
| 2024/0134878 | A1* | 4/2024 | Scrivano | G06F 9/45558 |
| 2024/0169062 | A1* | 5/2024 | Lee | G06F 21/554 |
| 2024/0345822 | A1* | 10/2024 | Mueller | G06F 16/128 |
| 2025/0209171 | A1* | 6/2025 | Barton | G06F 21/566 |

OTHER PUBLICATIONS

Anonymous, "Adaptative Governance Solution on Container Orchestrator System for License Assurance Using Annotations," The IP.com Journal, Jul. 25, 2023, 5 pages, ip.com, accessed Mar. 19, 2024, https://priorart.ip.com/IPCOM/000272734/Adaptative-Governance-Solution-on-Container-Orchestrator-System-for-License-Assruance Using Annotations.pdf.
Author unknown, "Generate the SBOM for Docker images," Docker Docs, 2024, 4 pages, docker.com, accessed Mar. 19, 2024, https://docs.docker.com/engine/sbom/.
Author unknown, "NVIDIA Container Runtime hook," Sarus, 2023, 4 pages, sarus.readthedocs.io, accessed Mar. 19, 2024, https://sarus.readthedocs.io/en/stable/config/nvidia-container-toolkit.html#nvidia-container-runtime-hook.
Author unknown, "Open Container Initiative Runtime Specification," GitHub, Feb. 13, 2024, 6 pages, github.io, accessed Mar. 19, 2024, https://github.com/opencontainers/runtime-spec.
Author unknown, "Project Copacetic: Directly patch container image vulnerabilities," GitHub, Jan. 3, 2024, 3 pages, github.com, accessed Mar. 19, 2024, https://github.com/project-copacetic/copacetic.
Author unknown, "What happens during rebase?," Buildpacks.io, 2022, 2 pages, buildpacks.io, accessed Mar. 19, 2024, https://buildpacks.io/docs/for-app-developers/concepts/rebase/.
Benedicic et al., "Sarus: Highly Scalable Docker Containers for HPC Systems," High Performance Computing, ISC High Performance 2019, Lecture Notes in Computer Science, 2019, pp. 46-60, vol. 11887, Springer, accessed Mar. 19, 2024, https://link.springer.com/chapter/10.1007/978-3-030-34356-9_5.
Chadwell, "Generating SBOMs for Your Image with BuildKit," Docker.com Blog, Jan. 24, 2023, 8 pages, docker.com, accessed Mar. 19, 2024, https://www.docker.com/blog/generate-sboms-with-buildkit/.
Gament, "Open Container Initiative hooks for admission control in Podman," Red Hat Blog, Jan. 19, 2024, 7 pages, redhat.com, accessed Mar. 19, 2024, https://www.redhat.com/en/blog/open-container-initiative-hooks-admission-control-podman.

* cited by examiner

300

302 304 306 308 310 312

| CONTAINER ID | PACKAGE INFO | FILE PATH | PACKAGE MANAGEMENT TOOL | USING IMAGE | PREVIOUS HOST INSTANCE VERSION |
|---|---|---|---|---|---|
| SHA256 | Log4j, VERSION ETC... | ./maven/xxx /log4j.jar | MAVEN | TRUE/FALSE | XXX |

FIG. 3

MANAGING CONTAINERS USING DATA STRUCTURE FOR FIXING SECURITY VULNERABILITIES AND EXPOSURES

BACKGROUND

The disclosure relates generally to managing containers and more specifically to managing metadata and application packages associated with containers.

A container is a lightweight, standalone, and executable software package that contains all necessary components to run an application or a service. A container encapsulates the application code, runtime environment, system libraries, and dependencies into a single executable unit to create an isolated execution environment such that the application runs reliably and consistently across various computing environments. In addition, the isolation created by container allows multiple containers to run on the same computer system without interfering with each other, thereby providing an efficient and resource-effective way to deploy and manage applications.

Container images, on the other hand, serve as blueprints for creating containers. A container image is a static source of a filesystem that contains the application code, runtime, dependencies, and other configuration files needed to run applications. Container images provide portable and immutable representation of application environments to ensure consistency and reproducibility across different deployment environments.

Containers and container images have revolutionized the way software is developed, packaged, and deployed. Containers and container images enable organizations to adopt efficient development practices, streamline the deployment pipeline, and therefore improve consistency, scalability, and efficiency in managing applications and infrastructure.

SUMMARY

According to one illustrative embodiment, a computer-implemented method for managing containers is provided. A processor set retrieves a container image from a container repository. The container image is retrieved by a host comprising a copy of the container image. The processor set updates the copy of the container image on the host based on filesystems in the container image retrieved from the container repository and metadata for the application packages associated with the container image retrieved from the container repository. The processor set creates a data structure comprising information for fixing security vulnerabilities and exposures for containers based on the metadata for the application packages, information associated with the application packages, and information associated with containers for the container image on the host. According to other illustrative embodiments, a computer system and a computer program product for managing containers are provided.

BRIEF DESCRIPTION OF THE DRAWINGS

FIG. 3 is an illustration of a data structure in accordance with an illustrative embodiment;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
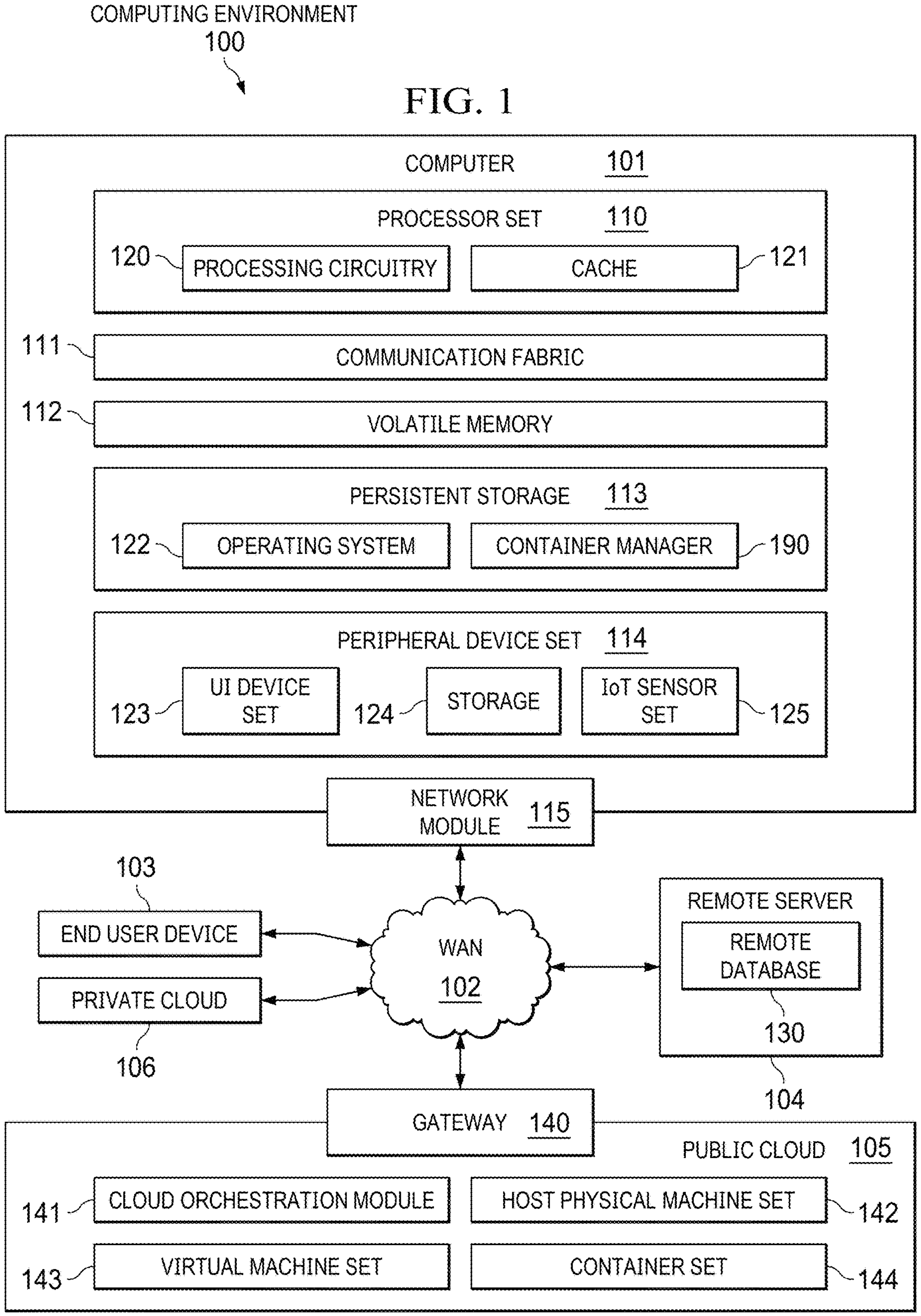
FIG. 1 is a pictorial representation of a computing environment in which illustrative embodiments may be implemented.

With reference now to the figures and in particular with reference to FIG. 1, a block diagram of a computing environment is depicted in accordance with an illustrative embodiment. Computing environment 100 contains an example of an environment for the execution of at least some of the computer code involved in performing the inventive methods, such as container manager 190. In addition to container manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and container manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one or more computer processors of any type now known or to be developed in the future. Processing circuitry 120 may be distributed over multiple packages, for example, multiple coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions and associated data are accessed by processor set 110 to control and direct performance of the inventive methods. In computing environment 100, at least some of the instructions for performing the inventive methods may be stored in container manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in container manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as a thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data application portability between the multiple constituent clouds. In this embodiment, public cloud 105 and private cloud 106 are both part of a larger hybrid cloud.

CLOUD COMPUTING SERVICES AND/OR MICROSERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. For example, the illustrative embodiments recognize and take into account that more people are starting to focus on Common Vulnerabilities and Exposures (CVE) and new communities with idea for software securities have been established in order to protect software from bugs and CVEs.

The illustrative embodiments also recognize and take into account that certain products from the new communities are not effectively used to protect software from bugs and CVEs. For example, Software Bill of Materials (SBOM) metadata from OpenSSF community are not effectively used to protect software from CVEs for OCI (Open Container Initiative) containers.

Thus, illustrative embodiments of the present invention provide a computer implemented method, computer system, and computer program product for managing containers. In one illustrative example, a computer implemented method manages containers. A processor set retrieves a container image from a container repository. The container image is retrieved by a host comprises a copy of the container image. The processor set updates the copy of the container image on the host based on filesystems in the container image retrieved from the container repository and metadata for application packages associated with the container image retrieved from the container repository. The processor set creates a data structure comprising information for fixing security vulnerabilities and exposures for containers based on the metadata for the application packages, information associated with the application packages, and information associated with containers for the container image on the host.

Figure 2:
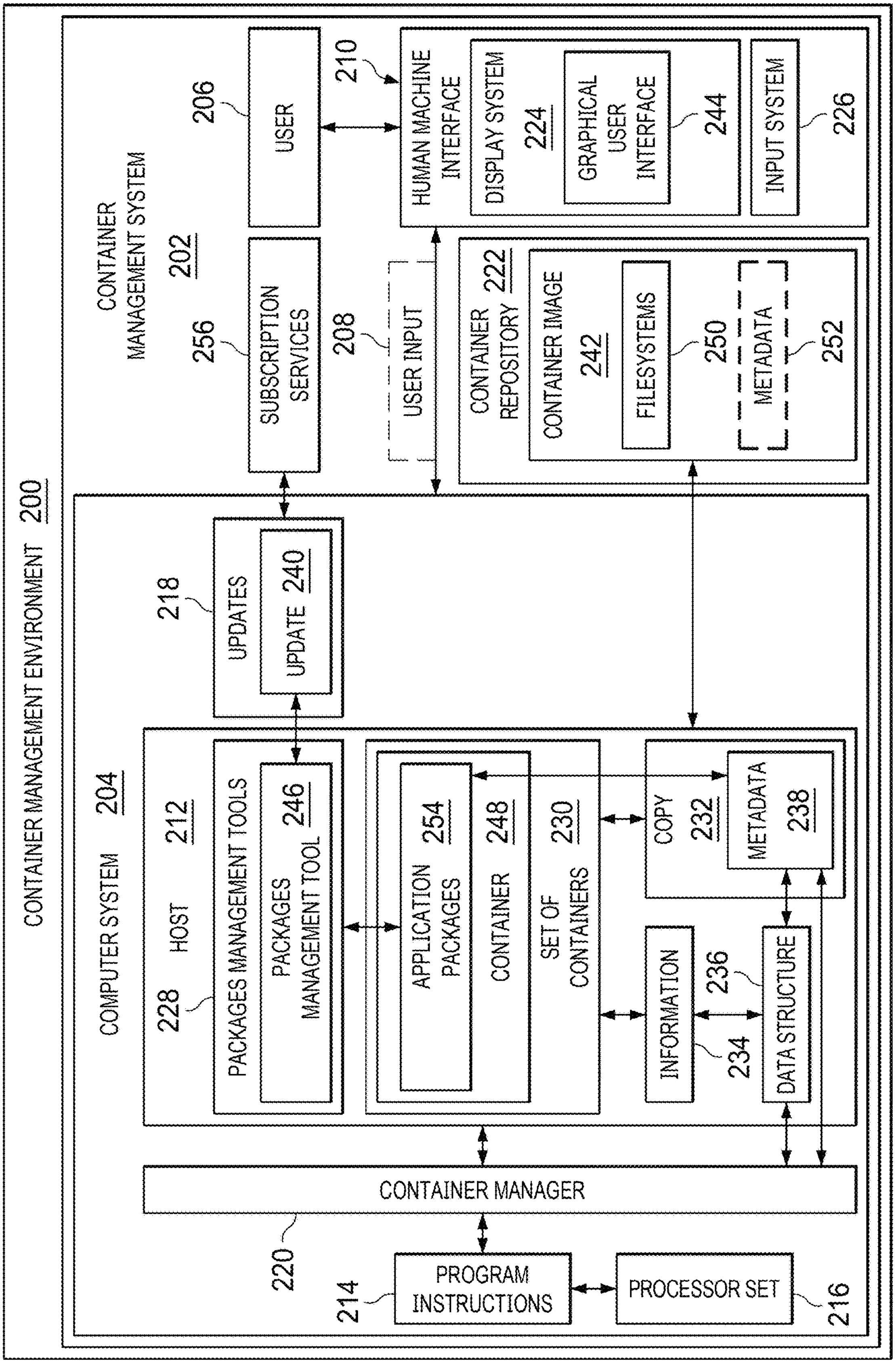
FIG. 2 is an illustration of a block diagram of a container management environment in accordance with an illustrative embodiment.

With reference now to FIG. 2, an illustration of a block diagram of a container management environment is depicted in accordance with an illustrative embodiment. In this illustrative example, container management environment 200 includes components that can be implemented in hardware such as the hardware shown in computing environment 100 in FIG. 1.

In this illustrative example, container management system 202 in container management environment 200 manages containers and application packages associated with containers. In this illustrative example, container management system 202 includes computer system 204 and container manager 220. Container manager 220 is located in computer system 204. Container manager 220 may be implemented using container manager 190 in FIG. 1.

Container manager 220 can be implemented in software, hardware, firmware, or a combination thereof. When software is used, the operations performed by container manager 220 can be implemented in program instructions configured to run on hardware, such as a processor unit. When firmware is used, the operations performed by container manager 220 can be implemented in program instructions and data and stored in persistent memory to run on a processor unit. When hardware is employed, the hardware can include circuits that operate to perform the operations in container manager 220.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 110 in FIG. 1. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, computer system 204 includes container repository 222. Container repository 222 is a centralized storage location used to store and manage container images. Container repository 222 functions as a secure repository where developers can store, organize, share, and distribute container images seamlessly across different environments.

As depicted, container repository 222 includes container images such as container image 242. Container images are executable packages that encapsulate applications along with dependencies, libraries, and runtime environments for the applications such that the applications can run consistently across different computing environments. In this illustrative example, container images in container repository 222 can be uploaded or pushed to container repository 222 by owners of container images.

In this illustrative example, container images such as container image 242 includes filesystems 250 and metadata 252. Filesystems 250 contains all the files, directories, binaries, and libraries required to run applications for container image 242. In this illustrative example, filesystems 250 can be layered such that each layer represents a different filesystem that can be shared or reused across multiple container images.

Metadata 252 is descriptive information that includes details for containerized application packages, images, or runtime environments for fixing security vulnerabilities and exposures for containers based on container image 242. Security vulnerabilities and exposures are weaknesses or flaws in software, hardware, or systems that can be exploited by attackers to compromise confidentiality, integrity, or availability of information and resources from containerized environments.

In this illustrative example, metadata 252 can include image indices, image configurations, software supply chain information such as SBOM (Software Bill of Material) metadata or Supply-chain Levels for Software Artifacts, or any suitable metadata for application packages associated with container image 242 and containers based on container image 242. In this illustrative example, Supply-chain Levels for Software Artifacts is a security framework of standard and controls that improve the integrity of application packages. In addition, SBOM metadata describe the composition of application packages and provides detail information related to open-source components, third-party libraries, frameworks, and other software components that are used to build and deploy application. In this illustrative example, SBOM metadata can be saved as a part of image indices or separately from image indices and image configurations.

Computer system 204 further includes host 212. Host 212 can be a device or computer system that is connected to a network to receive data. In this illustrative example, host 212 can be a physical hardware, a virtual machine, a server, a network device, or a running operating system. In this example, host 212 can be an owner of container image that uploads or pushes container images to container repository 222, or a user of container image that retrieves or pulls container images from container repository 222. In an alternative example, container manager 220 can also be implemented as a plug-in software in host 212.

For example, host 212 can use container manager 220 to retrieve container image 242 to update copy 232 on host 212. Copy 232 is a copy of container image for container image 242. In this example, filesystems in copy 232 are updated based on filesystems 250 and metadata 238 is updated based on metadata 252 in container image 242.

In a similar fashion, metadata 238 is descriptive information that includes details for containerized application packages, images, or runtime environments for fixing security vulnerabilities and exposures for containers based on copy 232. Metadata 238 can include image indices, image configurations, SBOM metadata, or any suitable metadata for application packages associated with container image 242 and containers based on container image 242. In this illustrative example, SBOM metadata can be saved as a part of image indices or separately from image indices and image configurations.

In an alternative example, container manager 220 can determine whether container image 242 includes metadata 252. If container image 242 does not include metadata 252, metadata 238 can be generated locally for copy 232 in host 212.

In this illustrative example, copy 232 can be used to deploy container 248. A container is a runtime instance for a container image. In other words, container 248 is a running instance for container image 242. In this illustrative example, container 248 includes application packages 254 that are associated with container 248. Application packages 254 are software and resources that are bundled together for creating containerized applications. Application packages 254 include all necessary components and dependencies required to run the created containerized applications within a containerized environment. In this illustrative example, application packages such as application packages 254 comes from filesystems in container images such as copy 232 and container image 242. In an alternative example, application packages such as application packages 254 comes from applications that are already installed on host 212.

As depicted, metadata 238 includes information for application packages 254 that can be used for fixing security vulnerabilities and exposures for application packages 254 and container 248. In this illustrative example, container manager 220 can use metadata 238 to generate data structure 236 for fixing security vulnerabilities and exposures for application packages 254 and container 248. For example, data structure 236 can include information that automatically or dynamically fixes the security vulnerabilities and exposures for containers such as container 248 upon deployment.

In this illustrative example, data structure 236 can be in form of a table that contains columns for storing information for fixing security vulnerabilities and exposures for application packages 254 and container 248. Data structure 236 can also include information 234 for set of containers 230 that includes container 248. In this illustrative example, information 234 can include information for set of containers 230 and information for application packages associated with set of containers 230. In other words, information 234 can include information associated with container 248 and information associated with application packages 254.

For example, data structure 236 can include columns for identifiers for containers in set of containers 230, versions for application packages such as application packages 254, file paths for application packages such as application packages 254, container images for containers listed in data structure 236, whether container is using versions of application packages from container images or received updates, or any information associated with set of containers 230 and application packages for set of containers 230.

In addition, data structure 236 can further include columns that contain information to indicate status of containers and application packages. For example, status can indicate that association between containers, container images, and metadata have been established in data structure 236, updates have been applied to containers in host 212, operations status of containers in host 212, operations status of containers in host 212 after applying updates, or anything that is related to containers in host 212 and application packages for containers in host 212.

In this illustrative example, container manager 220 can use data structure 236 to perform a number of tasks. For example, host 212 can include packages management tools 228 that receives updates 218 from subscription services 256. In this illustrative example, packages management tools 228 are software that help to automate installation, configuration, and management of software dependencies and components required by application packages associated with containers in containers. Subscription services 256 can be third-party services that provide access to software updates, patches, security fixes and new features for application packages for containers in host 212.

For example, packages management tool 246 can receive update 240 in updates 218. Container manager 220 uses data structure 236 to identify set of containers 230 that includes containers affected by update 240. In this illustrative example, packages management tool 246 can update application packages 254 for container 248 using update 240.

In another example, container manager 220 can use data structure 236 to determine if files required to run container 248 can be located in host 212. In this illustrative example, container manager 220 can make a file mount between container 248 and files located in host 212 such that portion of copy 232 for container image 242 does not need to be loaded for creating container 248. In a similar fashion, container manager 220 can refresh the file mount and restart container 248 after update 240 is applied to application packages 254.

In yet another example, container manager 220 can also rebuild copy 232 for container image 242 to reflect update 240 for application packages 254 when build process and source code for container 248 is available to access.

In this illustrative example, container manager 220 can also perform validations for containers after updating to ensure containers in host 212 can operate seamlessly without issues. For example, container manager 220 can restart container 248 after applying update 240 to application packages 254. Subsequently, container manager 220 performs a health check for container 248 to determine the operation status for container 248. In this illustrative example, the health check refers to a mechanism used to monitor the operation status of containers. The health check can include periodically assessing the operational state and responsiveness of containers to certain requests. The health check can validate various aspects of containers such as containers' abilities to accept incoming requests, containers' abilities to respond to specific queries, or handle resource-intensive tasks without errors.

In this illustrative example, if container 248 passes the health check, container manager 220 can update data structure 236 to indicate that container 248 uses latest versions of application packages 254 from update 240. On the other hand, if container 248 does not pass the health check, container manager 220 can update data structure 236 to indicate that container 248 uses versions of application packages 254 based on copy 232 for container image 242. In other words, container manager 220 can reroll container 248 to its previous state before update 240 is applied such that container 248 can use versions of application packages 254 based on copy 232 and data structure 236 to ensure functionalities provided by application packages 254 are not disrupted.

In this illustrative example, container manager 220 can make either versions of application packages 254 from update 240 or versions of application packages based on copy 232 a default option for creating container 248. In an alternative illustrative example, container manager 220 can also make specific versions of application packages 254 to be the default option for creating container 248.

In this illustrative example, user of host 212 can interact with computer system 204 through user inputs to computer system 204. For example, computer system 204 can receive user input 208 that includes a specially designed request for container 248 from user 206 to perform a health check for container 248. In this example, user input 208 can be generated by user 206 using human machine interface (HMI) 210. As depicted, human machine interface 210 includes display system 224 and input system 226. Display system 224 is a physical hardware system and includes one or more display devices on which graphical user interface 244 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, user 206 is a person that can interact with graphical user interface 244 through user input 208 generated by input system 226. Input system 226 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

In this illustrative example, container manager 220 maintains and update data structure 236 for all containers in host 212 such that updates 218 from subscription services 256 can be efficiently applied to containers to fix security vulnerabilities and exposures for containers in host 212, thereby improving the security and allocation of resources for computer system 204.

In one illustrative example, one or more solutions are present that overcome a problem with managing containers and application packages associated with the containers. As a result, one or more technical solutions may provide an ability to increase the efficiency and security for the containers and application packages associated with the containers.

In the illustrative example, computer system 204 can be configured to perform at least one of the steps, operations, or actions described in the different illustrative examples using software, hardware, firmware, or a combination thereof. As a result, computer system 204 operates as a special purpose computer system in which container manager 220 in computer system 204 enables managing containers in a host as well as application packages associated with the containers in the host. In particular, container manager 220 transforms computer system 204 into a special purpose computer system as compared to currently available general computer systems that do not have a container manager 220.

In the illustrative example, the use of container manager 220 in computer system 204 integrates processes into a practical application for managing containers that increases the performance of computer system 204. In other words, container manager 220 in computer system 204 is directed to a practical application of processes integrated into container manager 220 in computer system 204 that generate data structure to provide comprehensive information associated with containers, container images, and application packages associated with the containers such that actions can be taken to improve efficiency of applying updates to the application packages associated with the containers.

The illustration of container management environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, host 212 can have multiple containers running simultaneously and having multiple copies of container images and metadata for those running containers.

Turning next to FIG. 3, an illustration of a data structure is depicted in accordance with an illustrative embodiment. As depicted, data structure 300 can be in the form of a table and includes multiple columns to store information associated with containers and application packages associated with containers. In the illustrative examples, data structure 300 can be an example of data structure 236 in FIG. 2.

In FIG. 3, data structure 300 is in the form of a table. As depicted, data structure 300 includes a number of columns that include information that can be used for fixing security vulnerabilities and exposures for containers. For example, column 302 includes identifiers for containers and column 304 includes information for application packages and version of application packages associated with containers listed in column 302. In addition, column 306 includes file paths for the application packages listed in column 304 and column 308 includes information associated with package management tools that are used to manage application packages listed in column 304. Further, column 310 indicates whether the containers listed in column 302 uses a version of application packages from the container image for the containers listed in column 302. Column 312 includes information associated with the latest version of the application packages that are successfully executed on the host running the containers listed in column 302.

The illustration of data structure 300 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, data structure 300 can be in other forms such as list, array, trees, or any suitable forms that can be used to store information for fixing security vulnerabilities and exposures for containers. In addition, it should also be understood that the columns illustrated in FIG. 3 are exemplary columns. Data structure 300 can also include other types of information for fixing security vulnerabilities and exposures for containers. For example, data structure 300 can further include a column to indicate status of containers and applications packages, or a column to indicate which container image is used to create containers listed in column 302.

Figure 4:
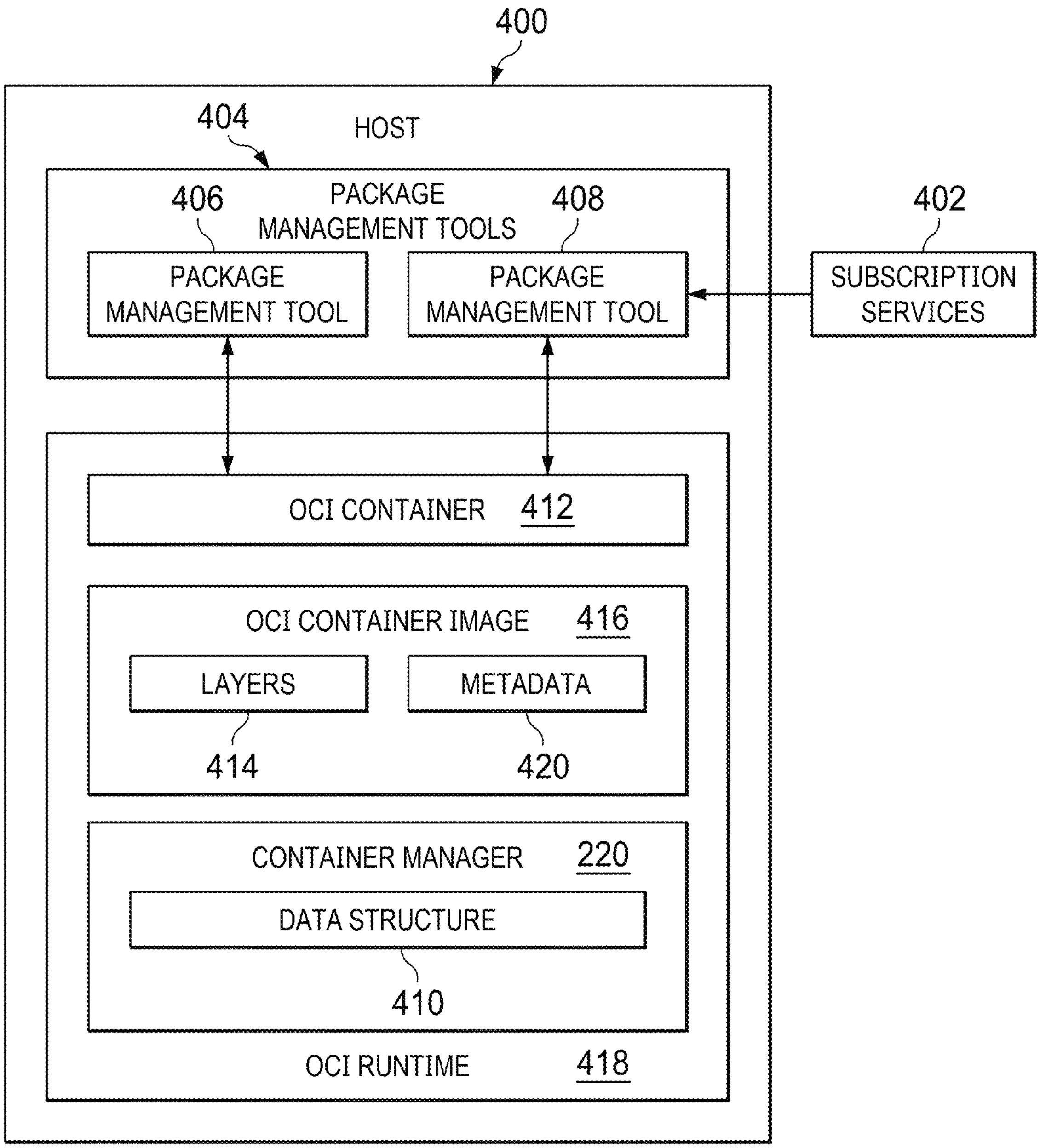
FIG. 4 is an illustration of applying updates to a host with a container for a container image in accordance with an illustrative embodiment.

Turning next to FIG. 4, an illustration of applying updates to a host with a container for a container image is depicted in accordance with an illustrative embodiment. In the illustrative examples, the illustration of applying updates in FIG. 4 can be an example of updating application packages 254 for container 248 in FIG. 2.

In the illustrative examples, the same reference numeral may be used in more than one figure. This reuse of a reference numeral in different figures represents the same element in the different figures.

In FIG. 4, host 400 receives updates for application packages from subscription services 402 using package management tools 404. In this illustrative example, host 400 can be an operating system running on a device such as a device in computer system 204 in FIG. 2. Subscription services 402 are third-party services that distribute and manage software products and services. For example, subscription services 402 can be Red Hat subscription services or IBM (International Business Machines) subscription services. Subscription services 402 can be an example of subscription services 256 in FIG. 2. Package management tools 404 are software that helps to manage application packages within containerized environment. Package management tools 404 can be used to install, update, and manage application packages for host 400. In this illustrative example, package management tools 404 can be examples of package management tools 228 in FIG. 2. In other words, host 400 is a subscriber of subscription services 402 and uses package management tools 404 to check and receive regular updates, bug fixes, and security patches from subscription services 402.

In this illustrative example, host 400 includes OCI runtime 418. As depicted, OCI runtime 418 is a software component responsible for running and managing containerized applications within a containerized environment. In this illustrative example, OCI runtime 418 includes the necessary infrastructure and services to create, start, stop, and manage containers based on container images. For example, OCI runtime 418 can create, start, stop, and manage OCI container 412 for OCI container image 416. In this illustrative example, OCI container 412 can be an example of container 248 in FIG. 2 and OCI container image 416 can be an example of copy 232 for container image 242 in FIG. 2.

In FIG. 4, container manager 220 uses data structure 410 to identify containers in host 400 that are affected by update received from subscription services 402. In this illustrative example, OCI container 412 created based on OCI container image 416 is identified to be affected by update received from subscription services 402. In this example, OCI container image 416 contains layers 414 and metadata 420. Layers 414 are filesystems that are used to run application packages associated with OCI container image 416 and metadata 420 includes information for fixing security vulnerabilities and exposures for OCI container 412, which is created based on OCI container image 416.

Package management tool 406 and package management tool 408 in package management tools 404 identify application packages associated with OCI container 412 based on data structure 410 for updates received from subscription services 402. In this illustrative example, each package management tool in package management tools 404 may correspond to a subscription service in subscription services 402. In other words, package management tool 406 and package management tool 408 correspond to different subscription services in subscription services 402.

In this illustrative example, package management tool 406 and package management tool 408 updates identified application packages associated with OCI container 412 for updates received from subscription services 402.

The illustration of updating application packages in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, host 400 can have more than one container created by different container images running in OCI runtime 418. In addition, data structure 410 can be stored separately to container manager 220 instead of within container manager 220, as illustrated in FIG. 4.

Figure 5:
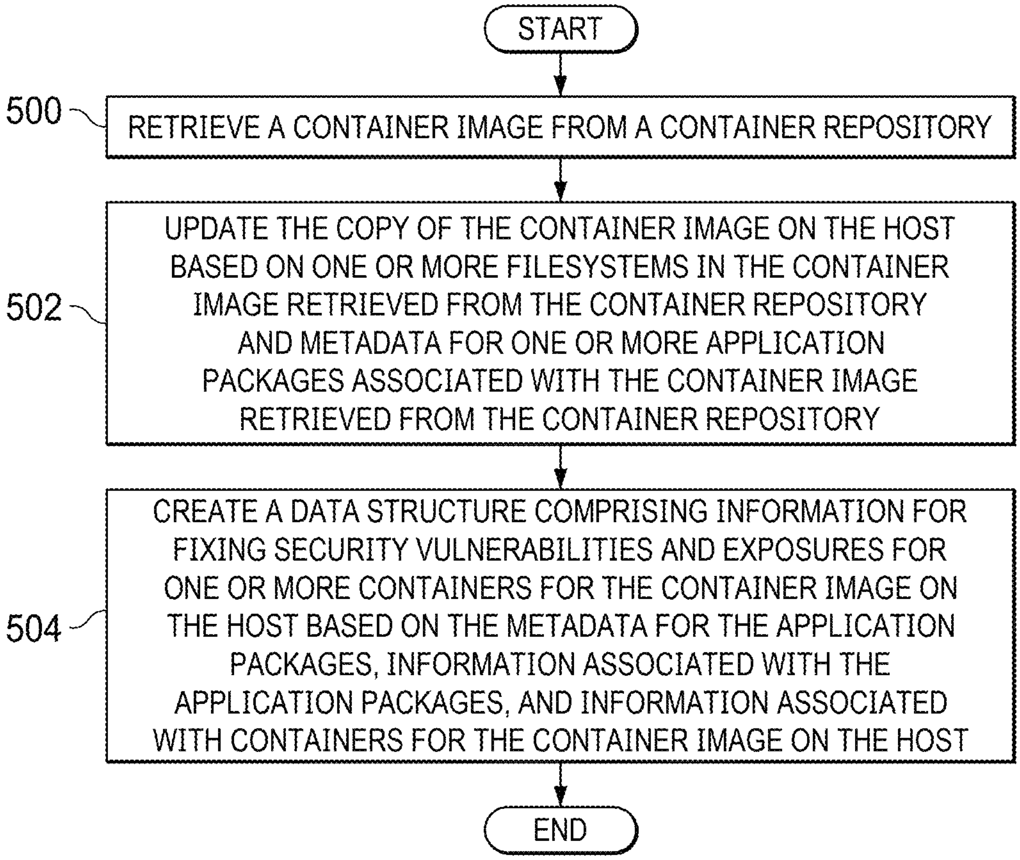
FIG. 5 is a flowchart of a process for managing containers in accordance with an illustrative embodiment.

With reference now to FIGS. 5, a flowchart illustrating a process for managing containers is shown in accordance with an illustrative embodiment. The process in FIG. 5 can be implemented in hardware, software, or both. When implemented in software, the process can take the form of program instructions that are run by one of more processor units located in one or more hardware devices in one or more computer systems. For example, the process can be implemented in container manager 220 in computer system 204 in FIG. 2.

The process begins by retrieving a container image from a container repository (step 500). In step 500, the container image is retrieved for a host and the host comprises a copy of the container image. The process updates the copy of the container image on the host based on one or more filesystems in the container image retrieved from the container repository and metadata for one or more application packages associated with the container image retrieved from the container repository (step 502).

The process creates a data structure comprising a data structure comprising information for fixing security vulnerabilities and exposures for one or more containers for the container image on the host based on the metadata for the application packages, information associated with the application packages, and information associated with containers for the container image on the host (step 504). The process terminates thereafter.

Figure 6:
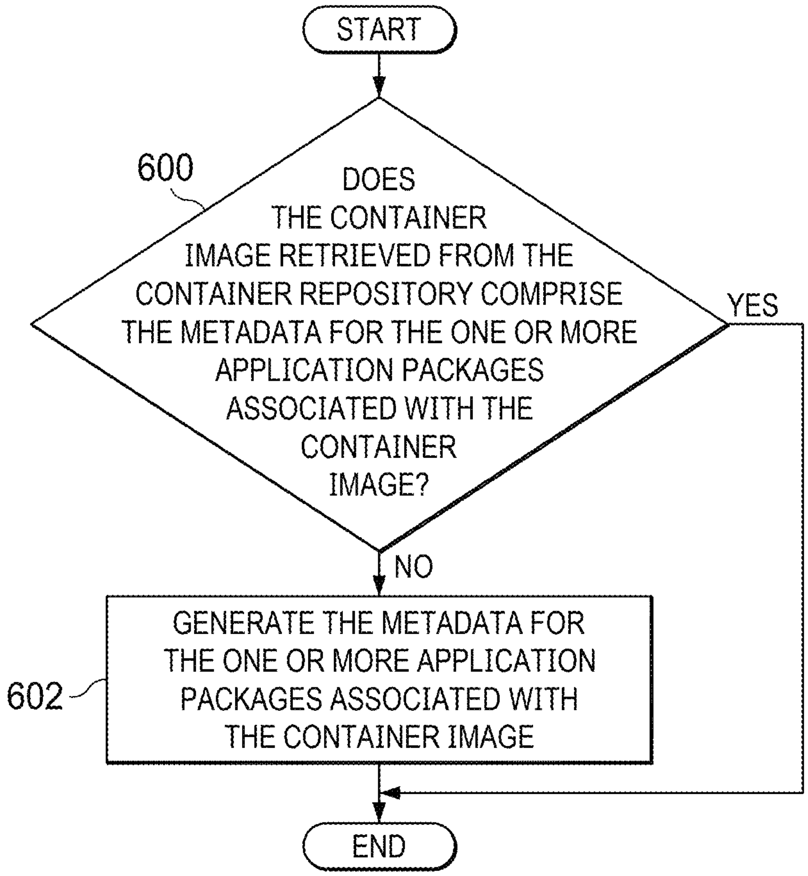
FIG. 6 is a flowchart of a process for generating metadata for the application packages in accordance with an illustrative embodiment.

Turning next to FIG. 6, a flowchart of a process for generating metadata for the application packages associated with the container image is depicted in accordance with an illustrative embodiment. The process in this figure is an example of an additional step that can be performed with the steps in FIG. 5.

The process begins by determining whether the container image retrieved from the container repository comprises the metadata for the one or more application packages associated with the container image (step 600). In response to determining the container image received from the container repository does not comprise the metadata for the one or more application packages associated with the container image, the process generates the metadata for the one or more application packages associated with the container image (step 602). The process terminates thereafter.

With reference again to step 600, if the container image retrieved from the container repository does comprise the metadata for the application packages associated with the container image, the process terminates thereafter.

Figure 7:
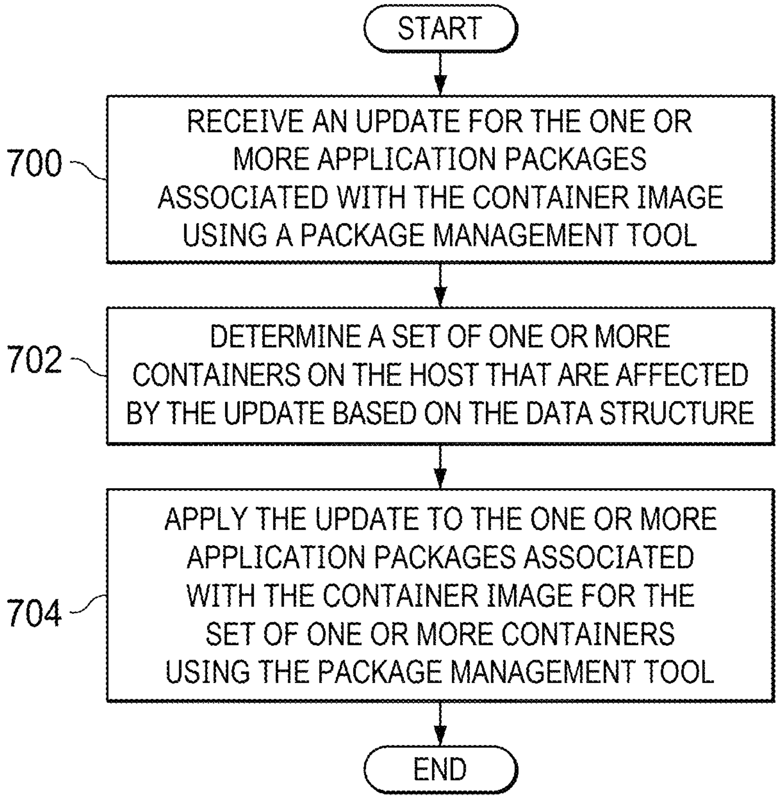
FIG. 7 is a flowchart of a process for updating application packages associated with the container image in accordance with an illustrative embodiment.

Turning next to FIG. 7, a flowchart of a process for updating application packages associated with the container image is depicted in accordance with an illustrative embodiment. The process in this figure is an example of an additional step that can be performed with the steps in FIG. 5.

The process begins by receiving an update for the one or more application packages associated with the container image using a package management tool (step 700). The process determines a set of one or more containers on the host that are affected by the update based on the data structure (step 702). The process applies the update to the one or more application packages associated with the container image for the set of one or more containers using the package management tool (step 704). The process terminates thereafter.

Figure 8:
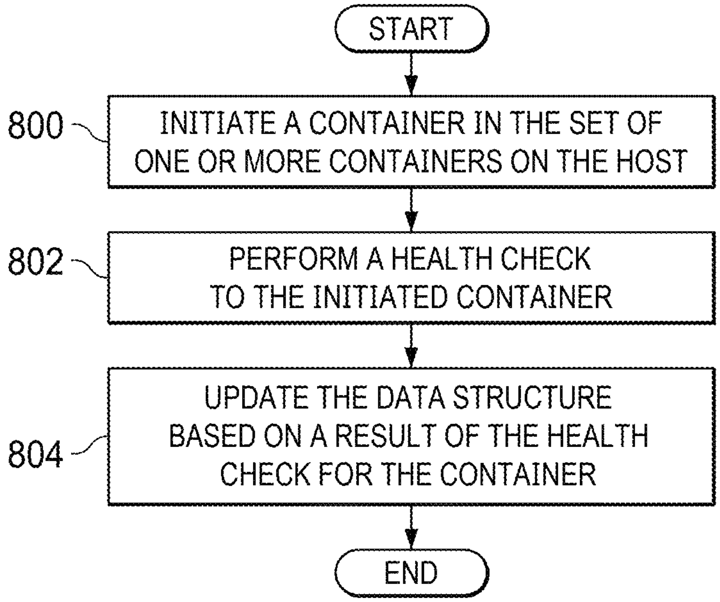
FIG. 8 is a flowchart of a process for updating data structure in accordance with an illustrative embodiment.

Turning next to FIG. 8, a flowchart of a process for updating data structure is depicted in accordance with an illustrative embodiment. The process in this figure is an example of an additional step that can be performed with the steps in FIG. 7.

The process begins by initiating a container in the set of one or more containers on the host (step 800). The process performs a health check to the initiated container (step 802). In step 802, the health check refers to a mechanism used to monitor operation status of containers. As depicted, the health check can include periodically assessing the operational state and responsiveness of containers to certain requests. The health check can validate various aspects of containers such as containers' abilities to accept incoming requests, containers' abilities to respond to specific queries or handle resource-intensive tasks without errors. The process updates the data structure based on a result of the health check for the container (step 804). The process terminates thereafter.

Figure 9:
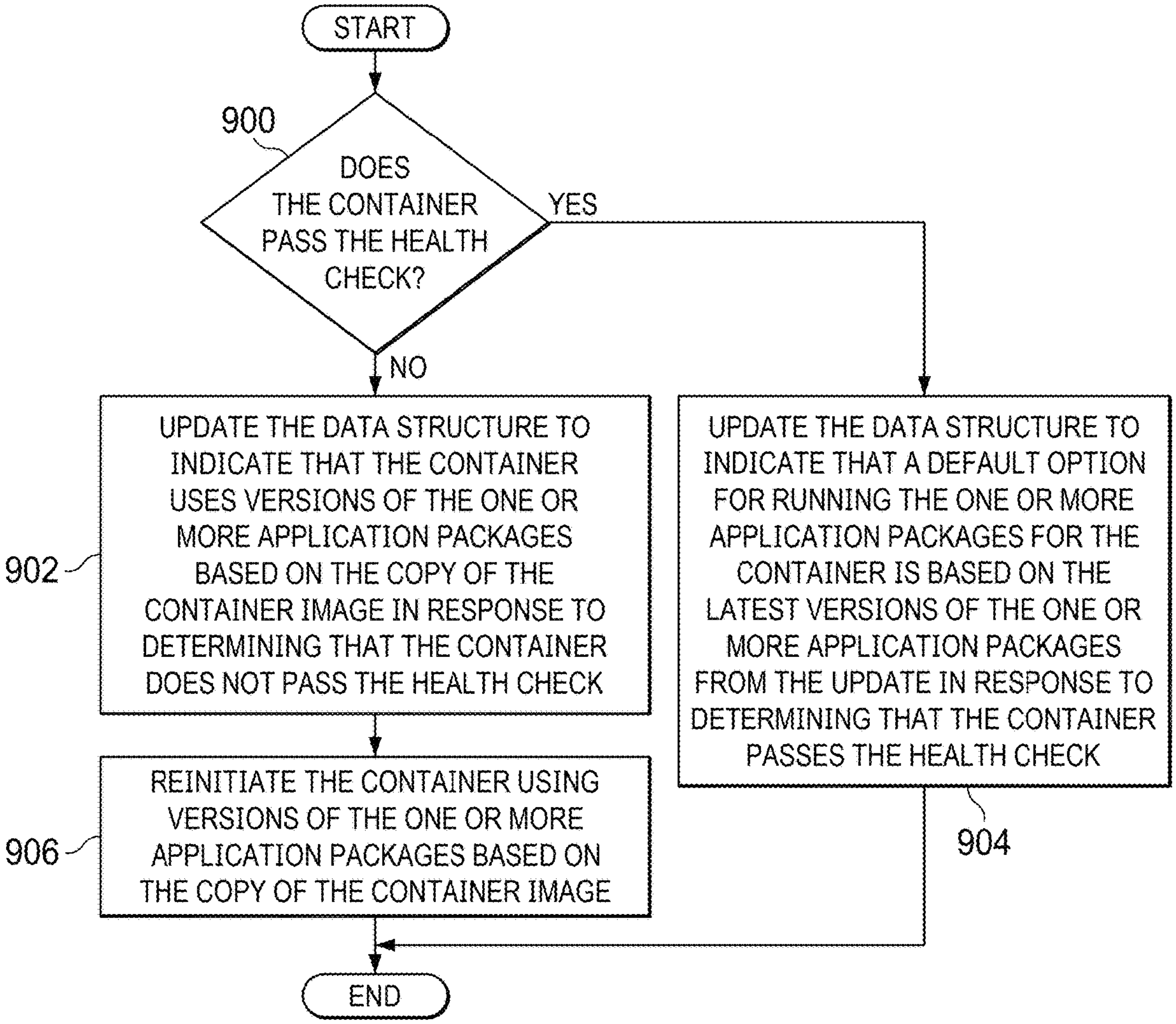
FIG. 9 is a flowchart of a process for updating the data structure in accordance with an illustrative embodiment.

Turning next to FIG. 9, a flowchart of a process for updating the data structure is depicted in accordance with an illustrative embodiment. The process in this flowchart is an example of an implementation for step 804 in FIG. 8.

The process begins by determining whether the container passes the health check (step 900). If the container does not pass the health check, the process updates the data structure to indicate that the container uses versions of the one or more application packages based on the copy of the container image in response to determining that the container does not pass the health check (step 902). The process reinitiates the container using version of the one or more application packages based on the copy of the container image (step 906). The process terminates thereafter.

With reference again to step 900, if the container passes the health check, the process updates the data structure to indicate that a default option for running the one or more application packages for the container is based on the latest versions of the one or more application packages from the update in response to determining that the container passes the health check (step 904). The process terminates thereafter.

Figure 10:
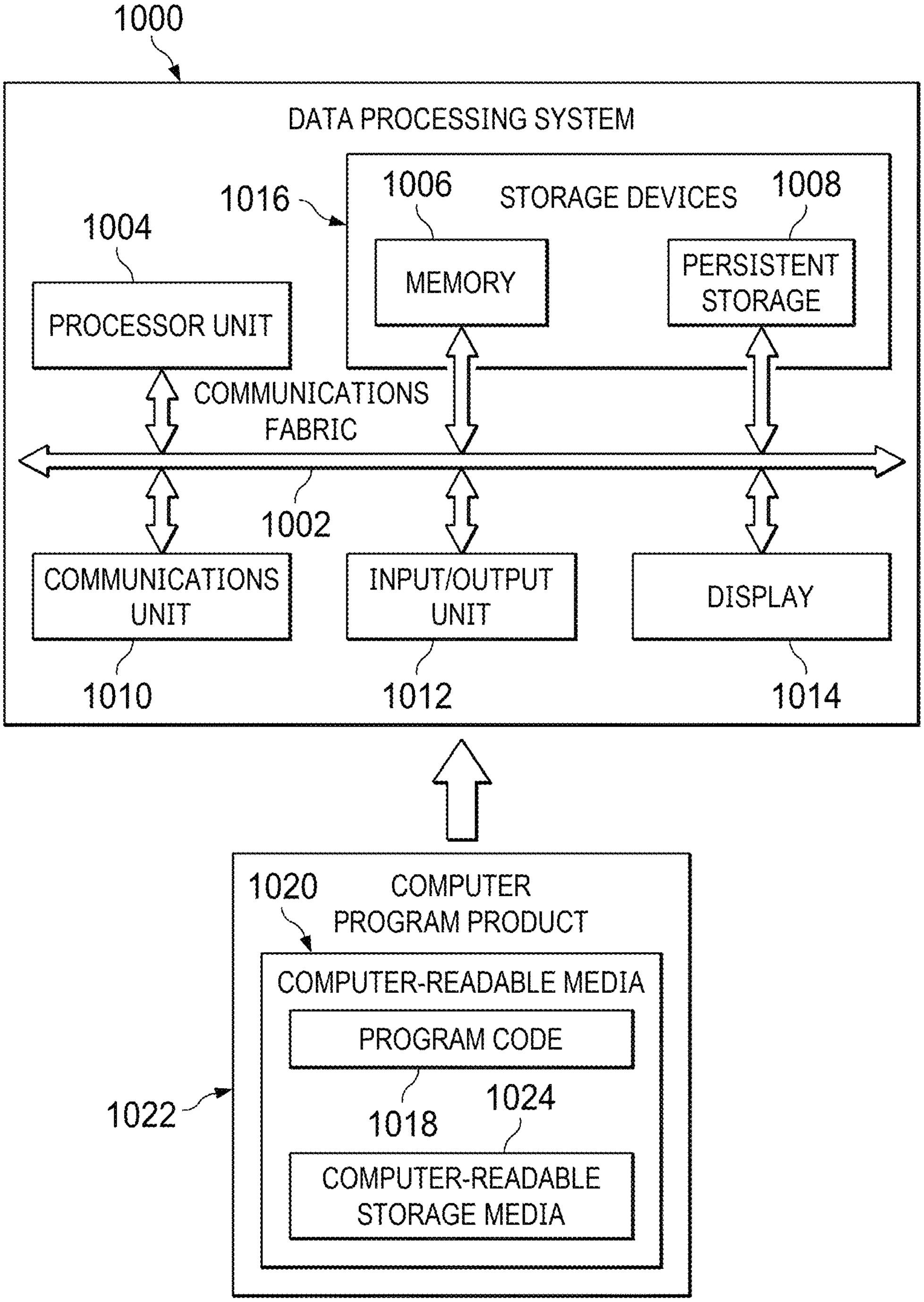
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement computers and computing devices in computing environment 100 in FIG. 1. Data processing system 1000 can also be used to implement computer system 204 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1004 can be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program instructions, computer usable program instructions, or computer-readable program instructions that can be read and executed by a processor in processor unit 1004. The program instructions in the different embodiments can be embodied on different physical or computer-readable storage media, such as memory 1006 or persistent storage 1008.

Program instructions 1018 are located in a functional form on computer-readable media 1020 that is selectively removable and can be loaded onto or transferred to data processing system 1000 for execution by processor unit 1004. Program instructions 1018 and computer-readable media 1020 form computer program product 1022 in these illustrative examples. In the illustrative example, computer-readable media 1020 is computer-readable storage media 1024.

Computer-readable storage media 1024 is a physical or tangible storage device used to store program instructions 1018 rather than a medium that propagates or transmits program instructions 1018. Computer-readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1018 can be transferred to data processing system 1000 using a computer-readable signal media. The computer-readable signal media are signals and can be, for example, a propagated data signal containing program instructions 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1020" can be singular or plural. For example, program instructions 1018 can be located in computer-readable media 1020 in the form of a single storage device or system. In another example, program instructions 1018 can be located in computer-readable media 1020 that is distributed in multiple data processing systems. In other words, some instructions in program instructions 1018 can be located in one data processing system while other instructions in program instructions 1018 can be located in one data processing system. For example, a portion of program instructions 1018 can be located in computer-readable media 1020 in a server computer while another portion of program instructions 1018 can be located in computer-readable media 1020 located in a set of client computers. The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program instructions 1018.

Thus, illustrative embodiments of the present disclosure provide a computer-implemented method, computer system, and computer program product for managing containers. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing containers, the computer implemented method comprising:

retrieving, by a processor set, a container image from a container repository, wherein the container image is retrieved for a host, and wherein the host comprises a copy of the container image;

updating, by the processor set, the copy of the container image on the host based on one or more filesystems in the container image retrieved from the container repository and metadata for one or more application packages associated with the container image retrieved from the container repository, wherein the metadata is obtained from one or more files in the one or more filesystems in the container image by extracting the one or more filesystems and parsing configuration files within the extracted filesystems and, wherein the metadata comprises Software Bill of Materials (SBOM) metadata that describes composition of the application packages and provides detail information related to open-source components, third-party libraries, frameworks, and other software components that are used to build and deploy application; and creating, by the processor set, a data structure comprising information for fixing security vulnerabilities and exposures for one or more containers for the container image on the host based on the metadata for the application packages, information associated with the application packages, and information associated with containers for the container image on the host, wherein the data structure is stored locally on the host and is used to selectively update individual application packages within running containers on the host without replacing entire container images.

2. The computer implemented method of claim 1 further comprising:

determining, by the processor set, whether the container image retrieved from the container repository comprises the metadata for the one or more application packages associated with the container image; and in response to determining the container image received from the container repository does not comprise the metadata for the one or more application packages associated with the container image, generating, by the processor set, the metadata for the one or more application packages associated with the container image.

3. The computer implemented method of claim 1 wherein the data structure is a table comprising: statuses of the one or more application packages and the one or more containers for the container image, identifiers for the one or more containers for the container image, versions of the one or more application packages, information associated with package management tools that are used to manage application packages, whether containers are using versions of application packages from container images or received updates, and file paths for the one or more application packages.

4. The computer implemented method of claim 1 further comprising:

receiving, by the processor set, using a package management tool, an update for the one or more application packages associated with the container image;

determining, by the processor set, a set of one or more containers on the host that are affected by the update based on the data structure; and applying, by the processor set, using the package management tool, the update to the one or more application packages associated with the container image for the set of one or more containers.

5. The computer implemented method of claim 4 further comprising:

initiating, by the processor set, a container in the set of one or more containers on the host;

performing, by the processor set, a health check to the initiated container; and updating, by the processor set, the data structure based on a result of the health check for the container.

6. The computer implemented method of claim 5, wherein updating, by the processor set, the data structure based on the result of the health check for the container comprises:

in response to determining that the container does not pass the health check, updating, by the processor set, the data structure to indicate that the container uses versions of the one or more application packages based on the copy of the container image; and reinitiating, by the processor set, the container using versions of the one or more application packages based on the copy of the container image.

7. The computer implemented method of claim 5, wherein updating, by the processor set, the data structure based on the result of the health check for the container comprises:

in response to determining that the container passes the health check, updating, by the processor set, the data structure to indicate that a default option for running the one or more application packages for the container is based on the latest versions of the one or more application packages from the update.

8. A computer system comprising:

a processor set;

a set of one or more computer-readable storage media; and program instructions, collectively stored in the set of one or more storage media, for causing the processor set to perform the following computer operations:

retrieve a container image from a container repository, wherein the container image is retrieved for a host, and wherein the host comprises a copy of the container image;

update the copy of the container image on the host based on one or more filesystems in the container image retrieved from the container repository and metadata for one or more application packages associated with the container image retrieved from the container repository, wherein the metadata is obtained from one or more files in the one or more filesystems in the container image by extracting the one or more filesystems and parsing configuration files within the extracted filesystems and, wherein the metadata comprises Software Bill of Materials (SBOM) metadata that describes composition of the application packages and provides detail information related to open-source components, third-party libraries, frameworks, and other software components that are used to build and deploy application; and create a data structure comprising information for fixing security vulnerabilities and exposures for one or more containers for the container image on the host based on the metadata for the application packages, information associated with the application packages, and information associated with containers for the container image on the host, wherein the data structure is stored locally on the host and is used to selectively update individual application packages within running containers on the host without replacing entire container images.

9. The computer system of claim 8, wherein the program instructions, collectively stored in the set of one or more storage media, further cause the processor set to perform the following computer operations:

determine whether the container image retrieved from the container repository comprises the metadata for the one or more application packages associated with the container image; and in response to determining the container image received from the container repository does not comprise the metadata for the one or more application packages associated with the container image, generate the metadata for the one or more application packages associated with the container image.

10. The computer system of claim 8, wherein the data structure is a table comprising: statuses of the one or more application packages and the one or more containers for the container image, identifiers for the one or more containers for the container image, versions of the one or more application packages, information associated with package management tools that are used to manage application packages, whether containers are using versions of application packages from container images or received updates, and file paths for the one or more application packages.

11. The computer system of claim 8, wherein the program instructions, collectively stored in the set of one or more storage media, further cause the processor set to perform the following computer operations:

receive an update for the one or more application packages associated with the container image using a package management tool;

determine a set of one or more containers on the host that are affected by the update based on the data structure; and apply the update to the one or more application packages associated with the container image for the set of one or more containers using the package management tool.

12. The computer system of claim 11, wherein the program instructions, collectively stored in the set of one or more storage media, further cause the processor set to perform the following computer operations:

initiate a container in the set of one or more containers on the host;

perform a health check to the initiated container; and update the data structure based on a result of the health check for the container.

13. The computer system of claim 12, wherein as part of updating the data structure based on the result of the health check for the container, the program instructions, collectively stored in the set of one or more storage media, cause the processor set to perform the following computer operations:

in response to determining that the container does not pass the health check, update the data structure to indicate that the container uses versions of the one or more application packages based on the copy of the container image; and reinitiate the container using versions of the one or more application packages based on the copy of the container image.

14. The computer system of claim 12, wherein as part of updating the data structure based on the result of the health check for the container, the program instructions, collectively stored in the set of one or more storage media, cause the processor set to perform the following computer operations:

in response to determining that the container passes the health check, update the data structure to indicate that a default option for running the one or more application packages for the container is based on the latest versions of the one or more application packages from the update.

15. A computer program product for managing containers, the computer program product comprising:

a set of one or more computer-readable storage media; and program instructions, collectively stored in the set of one or more storage media, cause a processor set to perform the following computer operations:

retrieve a container image from a container repository, wherein the container image is retrieved for a host, and wherein the host comprises a copy of the container image;

update the copy of the container image on the host based on one or more filesystems in the container image retrieved from the container repository and metadata for one or more application packages associated with the container image retrieved from the container repository, wherein the metadata is obtained from one or more files in the one or more filesystems in the container image by extracting the one or more filesystems and parsing configuration files within the extracted filesystems and, wherein the metadata comprises Software Bill of Materials (SBOM) metadata that describes composition of the application packages and provides detail information related to open-source components, third-party libraries, frameworks, and other software components that are used to build and deploy application; and create a data structure comprising information for fixing security vulnerabilities and exposures for one or more containers for the container image on the host based on the metadata for the application packages, information associated with the application packages, and information associated with containers for the container image on the host, wherein the data structure is stored locally on the host and is used to selectively update individual application packages within running containers on the host without replacing entire container images.

16. The computer program product of claim 15, wherein the data structure is a table comprising: statuses of the one or more application packages and the one or more containers for the container image, identifiers for the one or more containers for the container image, versions of the one or more application packages, information associated with package management tools that are used to manage application packages, whether containers are using versions of application packages from container images or received updates, and file paths for the one or more application packages.

17. The computer program product of claim 15, wherein the program instructions, collectively stored in the set of one or more storage media, further cause the processor set to perform the following computer operations:

receive an update for the one or more application packages associated with the container image using a package management tool;

determine a set of one or more containers on the host that are affected by the update based on the data structure; and apply the update to the one or more application packages associated with the container image for the set of one or more containers using the package management tool.

18. The computer program product of claim 17, wherein the program instructions, collectively stored in the set of one or more storage media, further cause the processor set to perform the following computer operations:

initiate a container in the set of one or more containers on the host;

perform a health check to the initiated container; and update the data structure based on a result of the health check for the container.

19. The computer program product of claim 18, wherein as part of updating the data structure based on the result of the health check for the container, the operation performed by the processor set comprises:

in response to determining that the container does not pass the health check, update the data structure to indicate that the container uses versions of the one or more application packages based on the copy of the container image; and reinitiate the container using versions of the one or more application packages based on the copy of the container image.

20. The computer program product of claim 18, wherein as part of updating the data structure based on the result of the health check for the container, the operation performed by the processor set comprises:

in response to determining that the container passes the health check, update the data structure to indicate that a default option for running the one or more application packages for the container is based on the latest versions of the one or more application packages from the update.

* * * * *